Figure 2:
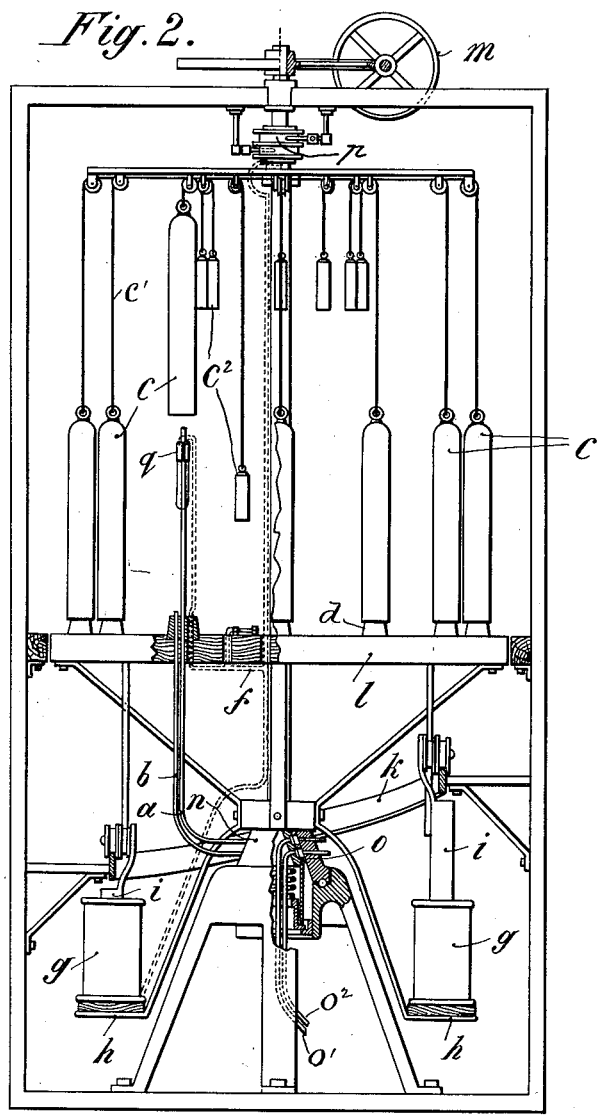

F. BLAU.
METHOD OF MANUFACTURING METALLIC ILLUMINATING BODIES FOR
ELECTRIC INCANDESCENT LAMPS.
APPLICATION FILED SEPT. 14, 1906.

985,387.

Patented Feb. 28, 1911.

Witnesses
Inventor
Fritz Blau
By
Attorneys

UNITED STATES PATENT OFFICE.

FRITZ BLAU, OF BERLIN, GERMANY, ASSIGNOR, BY MESNE ASSIGNMENTS, TO GENERAL ELECTRIC COMPANY, A CORPORATION OF NEW YORK.

METHOD OF MANUFACTURING METALLIC ILLUMINATING-BODIES FOR ELECTRIC INCANDESCENT LAMPS.

985,387.   Specification of Letters Patent.   Patented Feb. 28, 1911.

Application filed September 14, 1906. Serial No. 334,563.

*To all whom it may concern:*

Be it known that I, FRITZ BLAU, chemist, a subject of the Emperor of Austria-Hungary, and a resident of Berlin, Germany, have invented a new and useful Improved Method of Manufacturing Metallic Illuminating-Bodies for Electric Incandescent Lamps, and do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has for its object the improvement of known methods of manufacturing metallic illuminating bodies generally referred to as metallic filaments, according to which the raw filaments are heated in reducing gases to a white heat.

The filaments are suspended in vessels into which the reducing gas is led while an electric current can be sent into the filaments through terminals connected to a supply of electricity. It has been found in manufacturing filaments in this way that steam rises from the metal terminals and other metal parts employed for holding the filaments. This remarkable phenomenon is, as exhaustive experiments have shown, due to the fact that such parts, after the process of filament manufacture has been carried out during which they are heated very strongly, become oxidized on their outer surface when brought into contact with the atmosphere and when they are again subjected to heat that is to say the next time they are used, (*e. g.*

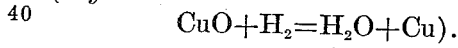

$$CuO + H_2 = H_2O + Cu).$$

The steam rising from the metallic parts is always injurious whether the work be carried out in dry gases or whether the gas contains moisture not exceeding a certain maximum amount. In order to prevent the formation of the steam and to avoid its injurious effects various means may be employed.

The terminals, that is to say the metal connecting parts in the interior of the vessel may be made of metals such as aluminum which do not become oxidized or of metals such as cast iron which will not be reduced at the temperatures occurring in this particular process. Or the cooling down of the terminals may be effected by the reducing gas of the working vessels itself so that when the vessels are opened or the terminals taken out they are already so cold that formation of oxid is avoided. Terminals which are already oxidized may be reduced before use. Again, the current of gas entering the interior of the vessel may be introduced at such a speed that the steam formed is diluted to an innocuous proportion. In the latter case the volume of gas required for working purposes is naturally considerable and in order to meet this disadvantage the same gas may be used repeatedly for a series of similar operations in vessels which are connected in series. In this case it is advisable to dry the steam-carrying current between each two successive operations.

Figure 1:
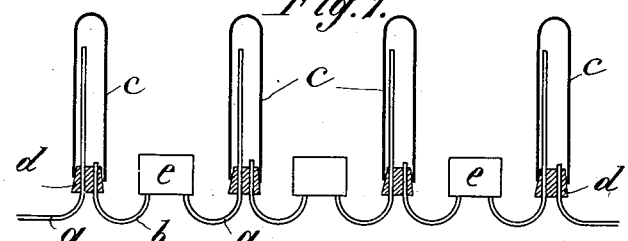

Figure 1 of the accompanying drawing shows diagrammatically an arrangement for repeatedly utilizing the same current of gas by arranging separate vessels in series. Fig. 2 illustrates suitable apparatus for carrying out the improved process.

Referring to Fig. 1, the gas is introduced into the first vessel $c$ through a tube $a$ and passes out through the pipe $b$ to the drying apparatus $e$ from whence it passes through another supply pipe $a$ into the next vessel and so on. The vessels are closed by perforated stoppers $d$.

The apparatus shown in Fig. 2 comprises a base plate 1 upon which the several vessels $c$ are arranged. The whole of the frame including the base 1 is adapted to be rotated by a motor $m$. With the rotary base plate $l$ is connected a valve barrel or shell $n$ to which the lower ends of the several tubes $a$, $b$ are secured. The rotary barrel $n$ coöperates with a stationary plug $o$ having pipes $o^1$, $o^2$, the upper ends of which are adapted to register, respectively, with the tube $a$ of one of the vessels $c$, and with the tube $b$ of the adjacent vessel $c$. The plug $o$ and valve shell $n$ also have passages so disposed that the gas entering through the pipe $o^1$ will travel through all of the vessels $c$ successively before reaching the outlet pipe $o^2$. As the shell $n$ rotates, each vessel $c$ will in turn become the first of the series to receive the gas from the pipe $o^1$ directly. The supply of the electric current to the filaments is likewise so automatically regulated that all the circuits $f$ are connected up in parallel, the distribution of the current being effected by a commutator $p$ rotating with the apparatus. If alternating currents be employed choking coils $g$ are used which are mounted upon a rotating ring $h$ and each connected in series with one of the heating apparatuses $q$ located within the vessel $c$. These vessels may be suspended by means of wires $c^1$ connected with counterweights $c^2$ so that each vessel may be readily raised or lowered relatively to the cork or plug $d$. The cores $i$ of the coils $g$ are fixed to the rotating part and are suitably raised and lowered by rollers secured to the cores traveling on a suitably shaped fixed guide rail $k$. In the case of continuous currents resistances are switched in or out of circuit by a similar arrangement.

Where in my claims I speak of treating filaments each in a separate chamber, I intend to refer to the process of treating them in series and to include such a process even if a plurality of filaments are treated in one or more of the chambers.

What I claim is:—

1. The method of manufacturing metallic illuminating bodies for incandescent electric lamps, which consists in heating the filament by the passage of an electric current in the presence of fluid of reducing character, and preventing the heated filament from being attacked by steam.

2. A method of manufacturing metallic illuminating bodies for electric incandescent lamps according to which filaments are heated by an electric current to a white heat in the presence of fluid of reducing character, applied profusely, substantially as set forth.

3. A method of manufacturing metallic illuminating bodies for electric incandescent lamps according to which filaments are heated by an electric current to a white heat in vessels, in the presence of fluid of reducing character introduced into said vessels at a high speed, substantially as set forth.

4. A method of manufacturing metallic illuminating bodies for electric incandescent lamps according to which filaments are connected to electric current supply metal terminals located within vessels and are then heated by an electric current to a white heat in the presence of fluid of reducing character, the metal terminals being cooled in the gas fed vessels, to a temperature sufficiently low to avoid oxidation, substantially as set forth.

5. A method of manufacturing metallic illuminating bodies for electric incandescent lamps according to which filaments are heated by an electric current to a white heat in a number of vessels arranged in series, in the presence of fluid of reducing character profusely applied and passed through all the vessels in succession, substantially as set forth.

6. A method of manufacturing metallic illuminating bodies for electric incandescent lamps according to which filaments are heated by an electric current to a white heat in a number of vessels arranged in series, in the presence of fluid of reducing character profusely applied and passed through all the vessels in succession, the flowing agent being freed from steam between each two vessels, substantially as set forth.

7. A method of manufacturing metallic illuminating bodies for electric incandescent lamps according to which filaments are heated by an electric current to a white heat in a number of vessels arranged in series, in the presence of fluid of reducing character profusely applied and passed through all the vessels in succession, the flowing reducing agent being dried between successive reducing operations, substantially as set forth.

8. A method for the manufacture of refractory metal filaments which consists in subjecting a plurality of filaments each in a separate chamber to heat treatment in the presence of fluid of reducing character applied profusely and passed through the chambers containing the filaments in series.

9. A method for the manufacture of refractory metal filaments which consists in profusely passing treating gas over a plurality of heated filaments in series, and removing from the gas products of the treatment of one filament before the gas reaches the next filament.

In testimony, that I claim the foregoing as my invention, I have signed my name in presence of two subscribing witnesses.

FRITZ BLAU.

Witnesses:
HENRY HASPER,
WOLDEMAR HAUPT.